(No Model.)
M. LEAK, W. B. HAYFORD, G. L. MERGUIRE & L. D. RADGESKY.
EGG CASE.
No. 540,502. Patented June 4, 1895.
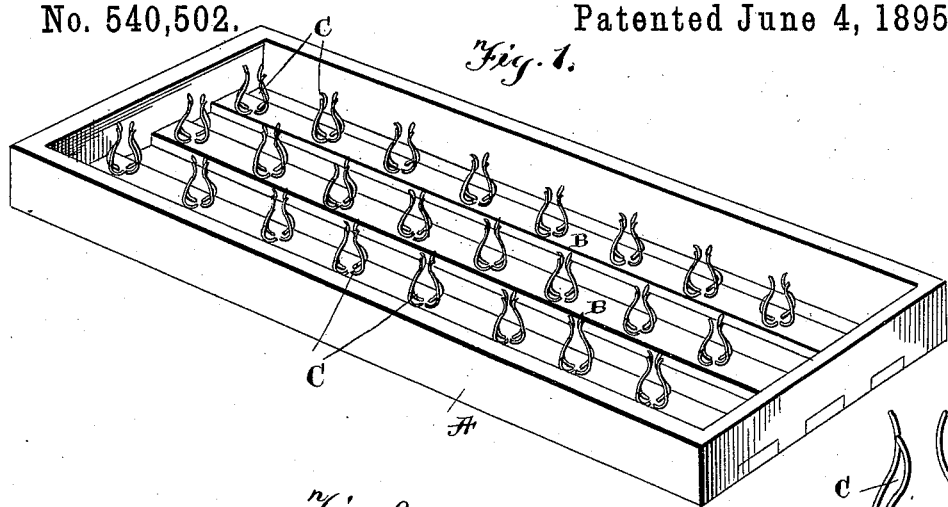
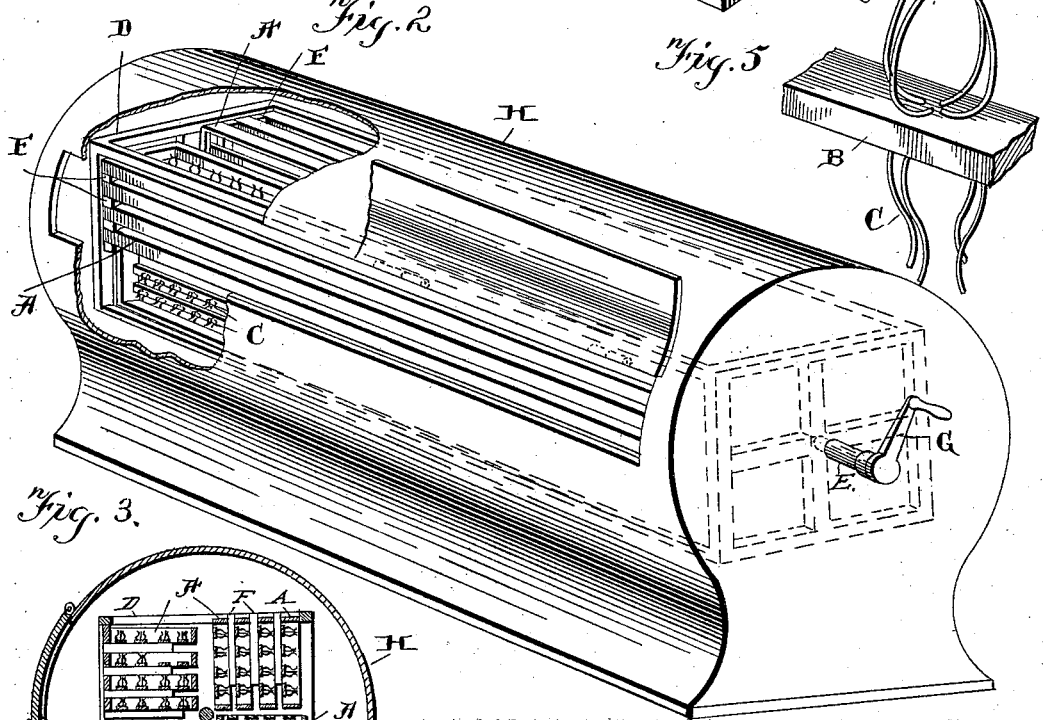
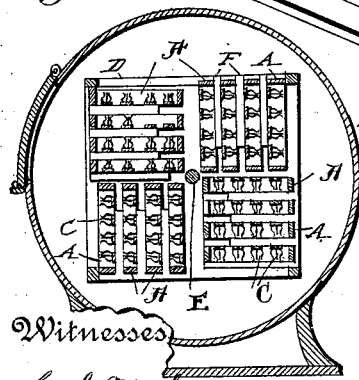
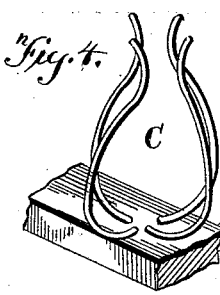
Witnesses
Geo. E. Fitch,
T. W. Fowler
Inventors
Mondula Leak
William B. Hayford
George L. Merguire
Louis D. Radgesky
By Attorneys
Dewey & Co.
THE NORRIS PETERS CO., PHOTO-LITHO., WASHINGTON, D. C.

UNITED STATES PATENT OFFICE.

MONDULA LEAK AND WILLIAM B. HAYFORD, OF SAN JOSÉ, AND GEORGE L. MERGUIRE AND LOUIS D. RADGESKY, OF SAN FRANCISCO, CALIFORNIA.

EGG-CASE.

SPECIFICATION forming part of Letters Patent No. 540,502, dated June 4, 1895.

Application filed January 7, 1895. Serial No. 534,156. (No model.)

*To all whom it may concern:*

Be it known that we, MONDULA LEAK and WILLIAM B. HAYFORD, residing at San José, county of Santa Clara, and GEORGE L. MERGUIRE and LOUIS D. RADGESKY, residing in the city and county of San Francisco, State of California, citizens of the United States, have invented an Improvement in Devices for Storing and Transporting Eggs and other Articles; and we hereby declare the following to be a full, clear, and exact description of the same.

Our invention relates to an apparatus which is designed for holding and transporting eggs, fruit, or delicate articles which it is desired to protect from injury during transportation, and also a means for turning eggs when the apparatus is used for containing them, so as to prevent the yelks of the eggs from settling to one side.

It consists in certain details of construction which will be more fully explained by reference to the accompanying drawings, in which—

Figure 1 is a view of our device. Fig. 2 is a separate view showing the interior arrangement of the framework and trays. Fig. 3 is a transverse section. Fig. 4 is an enlarged view of the holding device. Fig. 5 shows a holder projecting from opposite sides of the bar.

The holding device consists of a frame A which, in the present case, we have shown having transverse bars B mortised or otherwise secured and extending from one side to the other of the frame so as to leave open spaces between them. Upon each of the bars B of the frame are fixed the holders which consist of strips of wire, or, if preferred, flat strips of sheet metal or other thin material sufficiently elastic to retain their position. These strips are bent into form as shown at C, three or four of them being bent to correspond with the shape of the egg, fruit, or other article to be held by them. In the present case, we have shown four of these elastic arms or fingers C which are securely fastened to the cross bars B and projecting therefrom, having a curvature outwardly at the center, and being again drawn in at the top so that when the egg or other article is to be inserted, by pressing it downward from the top, the elastic arms will be separated to allow it to enter and will then close above it, thus holding it firmly in place. These holders may project from one or both sides of the bars, as they have sufficient grip to hold the articles, when the bars are reversed. As many of these holders are fixed to each bar as can be placed, while preserving a sufficient distance between the articles to be held, and the adjacent holders may be arranged to alternate with each other or otherwise, so as to occupy as much of the space as possible without actual contact. These holders may be placed in boxes of any description for transportation.

For the purpose of preserving eggs where it is desirable to keep them for some time, we have shown an exterior case or frame D having a shaft E extending through it from one end to the other. In the present case we have shown this exterior frame or case made rectangular and having cleats or guides F at each end upon which the trays or holders are adapted to slide so that any number of the holders may be introduced, which the frame B is capable of containing.

The whole device is preferably supported within an outer closed casing H, the shaft being journaled in the ends of the casing extending through it at one end so as to have a crank G or other means for rotating it when desired. This outer case is provided with a door or means by which access can be had to the interior. The door may be hinged or otherwise attached and have felt or other strips fixed along the edge so that when closed it will form a tight joint so that the interior of the case may be filled with carbonic acid gas or other suitable preservative. This door is in such a position, or of such a size that when opened it exposes one quarter of the inner rotary frame D, and the frames containing the eggs may be introduced into this section of the frame until it is full. When they are locked in place, the frame is rotated one-quarter of a revolution, which brings the next section opposite the door, and this is in like manner filled, the frame again rotated, and the third and fourth sections successively filled after which the door may be closed, and the apparatus will be in condition for use.

As before stated, any suitable preservative may be used within the outer case, if desired, but the principal object of the invention is to provide a means by which the inner frame D may be rotated at certain intervals for the purpose of turning the eggs, and thus preventing the tendency of the yelk to settle to one side as is the case when eggs remain for any considerable length of time in one position.

At certain intervals of time, the shaft of the inner frame may be turned for any part of a revolution that may be desired, and locked in position by any suitable or desired means, and by thus turning it at intervals, the position of all the eggs in the frame will be changed and the yelks prevented from settling to one side or the other so that when the eggs are taken out after any length of time that they may have been kept, they will all appear in good condition, with the yolks in the center the same as when fresh.

We have heretofore described a form of holder which is well adapted for the purpose, but it will be manifest that any device may be used which will hold each article independently, in conjunction with a mechanism by which the holders can be turned or reversed.

Having thus described our invention, what we claim as new, and desire to secure by Letters Patent, is—

A device for holding and preserving eggs consisting of an exterior closed case having a hermetically closing door extending longitudinally along one side of the case and of a length approximating that of the trays, an interior case or frame of approximately square cross section having a central shaft journaled and turnable with the frame in the outer case, vertical and horizontal cleats or guides within the turnable frame, frames fitted to slide upon said guides and be held therein, and curved elastic arms fitted in series to said frames and adapted to hold eggs or other articles by elastic pressure whereby they may be reversed in position without falling from the holders.

In witness whereof we have hereunto set our hands.

MONDULA LEAK.
WILLIAM B. HAYFORD.
GEORGE L. MERGUIRE.
LOUIS D. RADGESKY.

Witnesses as to the signatures of Mondula Leak and William B. Hayford:
P. W. CARROLL,
HIRAM D. TUTTLE.

Witnesses as to the signatures of George L. Merguire and Louis D. Radgesky:
JAMES L. KING,
WALTER N. KEMPSTON.